(12) United States Patent
Zhang

(10) Patent No.: US 8,715,508 B2
(45) Date of Patent: May 6, 2014

(54) PRINTING AND DYEING WASTEWATER TREATMENT AND REUSE APPARATUS AND METHOD THEREFOR

(75) Inventor: Shiwen Zhang, Fujian (CN)

(73) Assignee: Boying Xiamen Science and Technology Co., Ltd., Xiamen (CN)

( * ) Notice: Subject to any disclaimer, the term of this patent is extended or adjusted under 35 U.S.C. 154(b) by 0 days.

(21) Appl. No.: 13/992,754

(22) PCT Filed: Jul. 1, 2011

(86) PCT No.: PCT/CN2011/076749
§ 371 (c)(1),
(2), (4) Date: Jun. 9, 2013

(87) PCT Pub. No.: WO2012/083673
PCT Pub. Date: Jun. 28, 2012

(65) Prior Publication Data
US 2013/0256218 A1    Oct. 3, 2013

(30) Foreign Application Priority Data

Dec. 24, 2010 (CN) .......................... 2010 1 0605977

(51) Int. Cl.
*C02F 1/00* (2006.01)

(52) U.S. Cl.
USPC ................... 210/748.01; 210/763; 210/195.1; 210/295

(58) Field of Classification Search
USPC .......................... 210/748.01, 763, 195.1, 295
See application file for complete search history.

(56) References Cited

U.S. PATENT DOCUMENTS 4,163,716 A * 8/1979 Turnbull ....................... 210/665

* cited by examiner

*Primary Examiner* — Chester Barry

(57) ABSTRACT

A printing and dyeing wastewater treatment and reuse apparatus includes a coarse filter, a regulation pool, a hydraulic sieve, a desulfurization pool, a nanocatalytic electrolyzer, a flocculation pool, a flocculation tank, a settling pool, a flotation device, a biochemical pool, a secondary settling pool, a secondary nanocatalytic electrolyzer, a fine filter, a compressor, a nanomembrane assembly, and a recycling pool. Also provided is a printing and dyeing wastewater treatment and reuse method including steps of desulfurization, nanocatalytic electrolysis, flocculation, biochemical treatment, secondary catalytic electrolysis, filtration, and separation by membrane. The invention allows high $COD_{Cr}$ removal rate, reduced chemical agent consumption, reduced sludge formation, thorough treatment, and high water reuse rate.

10 Claims, 4 Drawing Sheets

Table 1

| No. | Items | Unit | Measured values | No. | Items | Unit | Measured values |
|---|---|---|---|---|---|---|---|
| 1 | Sensing indicators | | Colorless liquid | 6 | BOD5 | mg/L | 30 |
| 2 | pH | | 6.5 ~ 8.5 | 7 | Chloride ion | mg/L | 250 |
| 3 | Suspended solids (SS) | mg/L | - | 8 | Ammonia | mg/L | 1 |
| 4 | chromaticity | | 1 | 9 | Sulfate | mg/L | 100 |
| 5 | Turbidity | NTU | 5 | 5 | Total hardness | mg/L | 350 |
| 6 | $COD_{Cr}$ | mg/L | 50 | 6 | Total dissolved solids | mg/L | 500 |

FIG. 2

Table 2

| No. | Items | Unit | Measured values | No. | Items | Unit | Measured values |
|---|---|---|---|---|---|---|---|
| 1 | $COD_{Cr}$ | mg/L | 3160 | 5 | $S^{2-}$ | mg/L | 132 |
| 2 | SS | mg/L | 311 | 6 | chromaticity | | 600 |
| 3 | $NH_3$-N | mg/L | 265 | 7 | pH | | 9.3 |
| 4 | BOD5 | mg/L | 1030 | 8 | Sodium chloride | ‰ | 23 |

FIG. 3

Table 3

| No. | Items | Unit | Measured values | No. | Items | Unit | Measured values |
|---|---|---|---|---|---|---|---|
| 1 | Sensing indicators | | Colorless liquid | 6 | BOD$_5$ | mg/L | 15 |
| 2 | pH | | 7.5 | 7 | Chloride ion | mg/L | 110 |
| 3 | Suspended solids (SS) | mg/L | - | 8 | Ammonia | mg/L | 0 |
| 4 | chromaticity | | 0 | 9 | Sulfate | mg/L | 65 |
| 5 | Turbidity | NTU | 2 | 5 | Total hardness | mg/L | 135 |
| 6 | COD$_{Cr}$ | mg/l | 30 | 6 | Total dissolved solids | mg/L | 300 |

FIG. 4

Table 4

| No. | Items | Unit | Measured values | No. | Items | Unit | Measured values |
|---|---|---|---|---|---|---|---|
| 1 | COD$_{Cr}$ | mg/L | 2900 | 5 | S$^{2-}$ | mg/L | 92 |
| 2 | SS | mg/L | 270 | 6 | chromaticity | | 500 |
| 3 | NH$_3$-N | mg/L | 213 | 7 | pH | | 9.3 |
| 4 | BOD5 | mg/L | 850 | 8 | Sodium chloride | ‰ | 25 |

FIG. 5

Table 5

| No. | Items | Unit | Measured values | No. | Items | Unit | Measured values |
|---|---|---|---|---|---|---|---|
| 1 | Sensing indicators | | Colorless liquid | 6 | BOD5 | mg/L | 5 |
| 2 | pH | | 6.8 | 7 | Chloride ion | mg/L | 10 |
| 3 | Suspended solids (SS) | mg/L | - | 8 | Ammonia | mg/L | 0 |
| 4 | chromaticity | | 0 | 9 | Sulfate | mg/L | Undetected |
| 5 | Turbidity | NTU | 1 | 5 | Total hardness | mg/L | 5 |
| 6 | $COD_{Cr}$ | mg/L | 8 | 6 | Total dissolved solids | mg/L | 100 |

FIG. 6

PRINTING AND DYEING WASTEWATER TREATMENT AND REUSE APPARATUS AND METHOD THEREFOR

BACKGROUND OF THE INVENTION

1. Field of the Invention

The invention relates to printing and dyeing wastewater treatment and more particularly to a printing and dyeing wastewater treatment and reuse apparatus and method therefore based on nanocatalysis and membrane electrolysis technology.

2. Description of Related Art

Textile industry typically includes five major fields such as textile, printing and dyeing, chemical fiber, garment and textile equipment manufacturing. With the rapid development of science and technologies, printing and dyeing industry has entered a period of rapid development, equipment and technology has improved significantly, constantly upgraded production technology and equipment, and printing and dyeing enterprises developed rapidly. So far there are more than 2000 printing and dyeing enterprises in China solely. Dyeing process is the production process of the various types of textile materials, fibers, yarns, and fabrics for physical and chemical treatment and it includes the pre-treatment of textile materials, dyeing, printing and finishing processes which are referred as printing processes. At present, the development of textile technology of producing eco-textiles and green manufacturing technology for guidance, from the process, additives, equipment and other multi-channel is proceeded well to seize resources and focus on every aspect of the production process of ecological problems. Further, efforts are made to optimize textile technology and reduce chemicals, water and energy consumption in order to achieve efficient, high-speed, environment protection purposes. Great efforts have been made at home and abroad to develop environmentally friendly dye additives, new technologies of water-saving, energy-saving, and discharge reduction, new equipment, less water consumption in dry dyeing, coatings, textile printing and dyeing as well as energy, water and other novel aspects of great development. While the textile industry, water and wastewater treatment technologies have seen rapid development, wastewater produced by textile printing and dyeing industry in China is still one of the key sources of pollution in industrial sectors according to the State Environmental Protection Administration statistics. Regarding printing and dyeing industry, printing and dyeing wastewater discharge volume of industrial sectors in the country is about fifth of total discharge. An important characteristic of dyeing wastewater as environmental pollution is its large volume. Currently, the world's annual production is about 80 to 90 dyeing tons and the annual production is 150,000 tons in China the highest in the world. In the production about 10% to 15% of dyeing materials used in printing are, together with wastewater, discharged into the environment. As China's textile industry and dyeing industry developed, printing and dyeing wastewater pollution of the environment is more serious. In 2004 industry-wide discharge is 1.36 billion cubic meters, while the total discharge of pollutants as COD (chemical oxygen demand) is numbered sixth of pollutants among various industrial sectors. Secondary, as an environmental pollutant, printing types are various and complicated. Worldwide, there are more than 30,000 kinds of synthetic dyeing and printing and dyeing having more than 80% of azobenzene bond, poly-aromatic ring complex organic compounds. Printing and dyeing industry is a chemical industry that is an extremely serious environmental pollution industry. Color of printing and dyeing wastewater is significant. Organics thereof are at high concentrations with complex components. It has multi-biodegradable substances and contains a large amount of inorganic salts, sulfides, etc. And industrial wastewater it produced is the most serious. Because printing of complex aromatic molecules with molecular structure is more difficult of removal, the structure in the design and manufacture phase is a stable oxidant in order to accommodate water or light conditions. Thirdly, it is the most refractory organics for hazardous dyeing, chemical stability, carcinogenic, teratogenic and mutagenic 'three-induced' effect. Remnants of dyeing wastewater components even in small concentrations, are discharged into water and can slow water flow, resulting in the destruction of aquatic ecosystems. Therefore, an effective dyeing wastewater treatment has become an important issue.

Printing and dyeing wastewater with high concentration of pollutants which is various and may contain toxic ingredients and have a high color characteristic. Currently, at home and abroad, wastewater treatment methods used are physical, chemical, biological, and other processing technologies as detailed below.

1. Physical Methods

It includes adsorption flotation, membrane separation, gas ultrasonic vibration method, distillation and other methods. The physical treatment method is the most widely used one. Currently, the activated carbon adsorption as used abroad, the law on the removal of dissolved organic matter in water is very effective, but it cannot remove the water and the hydrophobic colloidal dyeing of cationic dyeing, direct printing and dyeing, acid dyeing, printing and dyeing with reactive dyeing and other water-soluble than good adsorption properties. Adsorption flotation method is first used on some highly dispersed powdery inorganic adsorbent such as bentonite, kaolin, etc. in the printing to adsorb ions and other soluble substances, then adding flotation agent to be converted to hydrophobic particles removed by flotation. The acidic dyeing, printing and direct printing and dyeing have removal efficiency of 92%.

The membrane used in dyeing wastewater treatment technologies includes ultra-filtration and reverse osmosis. Ultra-filtration technology for treatment of dyeing wastewater contains dispersed decolorization rate 80% to 97% and TOC removal rate is 60% to 85%. RO dissolved solids removal rate is from 85% to 99%, and the average recovery of 75% dye to 85%.

It is possible of controlling the ultrasonic frequency and saturated gas. The ultrasonic technology has become an effective method for wastewater treatment. Zhangjiagang City Fine Chemical Plant in Kyushu, based on ultrasonic vibration technology and the wastewater treatment equipment FBZ, processes dyeing wastewater and obtains a color removal rate of 97%, $COD_{Cr}$ removal rate of 90.6%, and a total pollution load reduction rate of 85.9%.

Chemical Method

Chemical methods include chemical coagulation, chemical oxidation, photochemical oxidation, electrochemical method and other methods. Chemical coagulation is a common method of dyeing wastewater treatment and was considered to be the most effective and economical bleaching technologies. Chemical oxidation dyeing wastewater decolorization is one of the main methods to use a variety of means for oxidation dyeing chromophore destruction bleaching. Oxidation by oxidants among other different conditions can be divided into chemical oxidation by ozone oxidation, and deep oxidation. In addition, the photochemical degradation of catalytic oxidation of organic matter as a deep oxidation technology has developed rapidly in recent years. Zhang Guilan (Zhang Guilan, dye wastewater in an open rotating photo-catalytic degradation of the pool, Textile Research, 2005, 263: 109-111) used this method to obtain a good degradation of dyeing wastewater decolorization. Electrochemical method is through the electrode reactions for dyeing wastewater purification. Micro-electrolysis method is the use of iron-carbon filler corrosion in the electrolyte solution of the original formation of numerous tiny batteries electrochemical wastewater treatment technology which is a set of electrolysis, coagulation, flocculation electricity, adsorption, and other physical and chemical effects in one method of treating wastewater. In the process of printing and dyeing wastewater treatment, dyeing molecules are adsorbed to the carbon surface first, and then at the electrodes oxidation or reduction reactions are occurred. Electrolysis electrode can also be used. Jin-Ping Jia, etc. (Jin-Ping Jia, etc., containing dye wastewater treatment methods Status and Progress, 2000, 191: 26-29) use activated carbon fibers as electrode conductivity of the electrode, adsorption, catalysis, redox (reduction-oxidation) actions, and flotation, comprehensive techniques to achieve adsorption-electrode reaction-desorption train flocculation process. The decolorization rate was 98%, and $COD_{Cr}$ removal efficiency is greater than 80%. Yan Bin (Yan Bin, micro electrolysis dyeing wastewater applied research, Xiamen Institute of Technology, 2008, 16 (1): 18-22) studied the iron-carbon micro-electrode electrolysis technology blends of cotton and chemical fiber series woven fabrics produced decolorization and $COD_{Cr}$ removal results in the iron-carbon mass ratio 2:1, HRT is 1.5 h time, COD removal efficiency up to 55%, color removal was 95%, BOD (biochemical oxygen demand)/COD from 0 3 to about 0.5. Luo Jing hygiene (Luo Jing hygiene, water treatment technology, 2005, 31 (11):67-70) used cyclic iron-carbon micro electrolysis containing dyes, dye intermediates, and additives such as wastewater study, the results show that the raw water pH has a great impact on the treatment effect. When the pH is 1 to 5:00, pH is lower, and its effect is better. When the pH is 1, COD removal rate is about 60% and more than 94% color is removed. Deng Sihong (Deng Sihong, Environmental Science and Management, 2008, 33 (3): 120-122) obtained results include high levels of pollutants, the concentration of large fluctuations, alkaline, high color, difficult biochemical dyeing wastewater using micro-electrolysis plus physicochemical and biological treatment. The process runs three consecutive months and the results indicate that the process is stable, less investment, low processing cost (per ton cost of treatment is about 0.765 RMB), COD, BOD, SS and color removal rates were 94%, 96%, 89%, and 96% respectively and water quality indicators meet discharge standards. Epolito William J, HanbaeYang, et al. use micro-electrolysis method to study RB4 (Reactive Blue4) wastewater. Experiment results showed that the decolorization rate increases as the pH and stirring intensity, the experiment temperature and ionic strength increases. Many other treatments of dyeing wastewater employing electrochemical method reported similar results.

3. Biochemical Method

Dyeing Wastewater has a poor biodegradability. If you use biochemical treatment, you can improve the activated sludge biological sludge activity MLSS and improve the performance. Alternatively, you can select efficient strains to improve the biochemical results. Breeding and training excellent bleaching flora is an important biochemical development direction. Other countries have carried out using mutation breeding, protoplast fusion, genetic engineering and other technologies for the formation of high-performance printing with multiple plasmids bleaching in engineering bacteria research. Recent studies show that the Pseudomonas bacteria, natans, *Arthrobacter, Bacillus subtilis*, yeast and other advantages of the oxidation dyeing degradation bacteria have considerable effects.

In recent years, the combination of chemical and physical methods for dyeing wastewater treatment and biological methods for dyeing wastewater treatment and physical methods developed rapidly. China Patent Number ZL200710008643.0 discloses a membrane-based technique of dyeing wastewater treatment method which is the chemical flocculation and precipitate, biological treatment and reverse osmosis separation technology combining printing and dyeing wastewater treatment. While above methods have better treatment effect, they have the following problems:

In physical fields, activated carbon adsorption, while having good effect, but the activated carbon regeneration is difficult, has a high cost, and its application is limited. Many enterprises are turning to other inexpensive, readily available materials adsorbents. Although electrolysis, oxidation of dyeing wastewater in the removal of color have a certain effect, but often have unsatisfactory COD removal, treatment chemicals cost is relatively high, and many new oxidation methods are still in the experimental study stage without being industrialized.

In biochemical fields, printing and dyeing typically is fine chemical products, with a small quantity and variety of features, its complex structure, long production process, from raw materials to finished products are often accompanied by nitration, condensation, reduction, oxidation, diazotization, coupling, etc. Unit operations, products and more product yield is low, wasted organic complex composition, printing and dyeing production of chemical reactions and separation, purification, washing and other process operations are using water as a solvent with a large volume of water. Biological treatment of dyeing wastewater although has advantage of less investment, but there are still difficult of being applied to microorganisms dyeing wastewater treatment and has water quality fluctuations, toxicity and other shortcomings. There is a sludge treatment, anaerobic biogas processing and management of complex issues. In addition, although the use of iron-carbon as electrode electrolysis method, dyeing wastewater has made some progress, but it brings a lot of precipitated iron-carbon consumption, so that the treated wastewater is difficult to use and only meet general discharge standards.

Dyeing wastewater treatment using a single treatment is often difficult to achieve desired effects. Conventional approach is to combine the treatment methods and unfortunately it is a long process, running costs are high, the water quality is poor and has other defects. The treated wastewater only reaches stage II discharge standards. Because of this wastewater has gone through the biochemical, chemical, physico-chemical and other methods of treatment, physical and chemical properties are very stable, very difficult to purify subsequent bleaching, the typical methods are difficult to carry out further bleaching purification, and this reaches stage II discharge standard about advanced treatment of wastewater. Discharge on the environment will also cause long-term effects. On the other hand, the current freshwater resources are increasingly polluted. Water conflicts have become increasingly prominent, such as dyeing wastewater being treated for reuse. It not only significantly reduces the impact on the environment but also saves a lot of freshwater resources.

SUMMARY OF THE INVENTION

Disclosure of the Invention

Technical Issues

An object of the invention is to solve problems of the conventional dyeing wastewater treatments having an excess of chemicals consumption and more discharge from large sludge, wastewater treatment not reaching the standard of industrial wastewater reuse, wastewater discharging more waste, high cost and complicated to operate and easy to bring secondary pollution and other shortcomings by providing a printing and dyeing wastewater treatment and reuse apparatus and method therefore for increasing $COD_{Cr}$ removal efficiency, decreasing consumption of chemicals, producing less sludge, providing a more thorough treatment, and increasing water reuse rate based on nanocatalytic electrolysis and membrane electrolysis technology.

Technology Solutions

The dyeing wastewater is referred to dyeing wastewater collected from various wastewater discharging steps called combined wastewater.

Printing and dyeing wastewater treatment and reuse apparatus according to the invention comprises a coarse filter, a regulation pool, a hydraulic sieve, a desulfurization pool, a nanocatalytic electrolyzer, a flocculation pool, a flocculation tank, a settling pool, a flotation device, a biochemical pool, a secondary settling pool, a secondary nanocatalytic electrolyzer, a fine filter, a compressor, a nanomembrane assembly, and a recycling pool wherein the coarse filter has an inlet communicating with an external wastewater source, outlet of the coarse filter connects to entrance of the regulation pool, inlet of the hydraulic sieve communicates with the wastewater source, inlet of the desulfurization pool is connected to outlet of the hydraulic sieve, outlet of the desulfurization pool is connected to a pump via pipes, an inlet of the nanocatalytic electrolyzer is connected to a wastewater outlet of the desulfurization pool, an outlet of the nanocatalytic electrolyzer is connected to an inlet of the desulfurization pool, an outlet of the desulfurization pool is connected to an inlet of the settling pool, a precipitate outlet of the settling pool is connected to the pump via pipes, a wastewater outlet of the settling pool is connected to an inlet of the flotation device, an impurities outlet of the flotation device is connect to the pump via pipes, a wastewater outlet of the flotation device is connected to the biochemical pool via the pump, an outlet of the biochemical pool is connected to an inlet of the secondary settling pool, a wastewater outlet of the secondary settling pool is connected to an inlet of the secondary nanocatalytic electrolyzer, a precipitate outlet of the secondary settling pool is connected to the pump via pipes, a wastewater outlet of the secondary nanocatalytic electrolyzer is connected to an inlet of the fine filter, an outlet of the fine filter is connected to an inlet of the membrane assembly, an outlet of the membrane assembly is connected to the recycling pool, a condensate outlet of the membrane assembly is connected to a wastewater drain, an outlet of the compressor is connected to the biochemical pool, and impurities of the compressor are conveyed to a mud pool via a conveyor.

An impurities outlet of the flotation device is disposed on an upper portion. A wastewater outlet of the flotation device is located on a lower portion. The wastewater outlet of the secondary settling pool is located on an upper portion. The precipitate outlet of the secondary settling pool is located on bottom.

Anode of the nanocatalytic electrolyzer is a titanium substrate having a surface covered with crystal grains of 18 to 22 nm nanocatalytic coating and served as an inert electrode. Cathode of the nanocatalytic electrolyzer is a cathode made of iron, aluminum, stainless steel, zinc, copper or graphite.

A printing and dyeing wastewater treatment and reuse apparatus of the invention comprises the following steps:

Step 1 of Desulfurization

Flowing combined printing and dyeing wastewater into the coarse filter to remove large particles of solids flowing into the regulation pool, and then activate a pump in the regulation pool to force wastewater to pass a sieve to remove fibers and other impurities prior to flowing into the desulfurization pool, adding ferrous sulfate solution, performing desulfurization, and separating into iron sulfide sludge and desulfurized wastewater.

In step 1, equivalent concentration of sulfur in wastewater can be determined prior to the desulfurization, and then adding a solution of ferrous sulfate with equivalent concentration of 1:1.1 into wastewater for desulfurization and separation into iron sulfide sludge and desulfurized wastewater.

Step 2 of Nanocatalytic Electrolysis

After step 1, pump desulfurized wastewater into the nanocatalytic electrolyzer for electrolysis.

In step 2, the operating voltage of the electrolysis may be 2 to 500V, the voltage between the two electrodes may be 2 to 8 V, electrolytic density is 10 to 300 $mA/cm^2$, and the desulfurized wastewater is kept in the nanocatalytic electrolyzer for a time of 5 to 15 min.

Step 3 of Flocculation

After step 2, flowing wastewater which has been processed by the nanocatalytic electrolyzer into the flocculation pool, adding prepared flocculants, coagulant agents and flotation agents to the flocculation pool for flocculation reaction, flowing same to the settling pool for precipitate, flowing the precipitate on the bottom of the settling pool to the compressor via pump and pipes for separating into filtrate and sludge, flowing wastewater in the settling pool to the flotation device for separating the impurities from the wastewater, flowing the impurities to a compressor via pump and pipes for separating into filtrate and sludge, flowing the filtrate to the nanocatalytic electrolyzer, and flowing the wastewater in a lower portion of the flotation device into the biochemical pool.

In step 3, the flocculants can be ferrous sulfate, ferric sulfate, poly iron, aluminum sulfate, aluminum chloride, or poly aluminum, the coagulant can be lime, polyacrylamide (PAM), etc., and the flotation agents may be polyacrylamide (PAM), etc.

Step 4 of Biochemical Treatment

After step 3, flocculated wastewater in a lower portion of the flotation device flowing into the biochemical pool, next subjecting same through aerobic or anaerobic+aerobic or anoxic, and aerobic treatment, and subjecting same in the secondary settling pool, flowing the biochemically processed wastewater out of upper portion of the secondary settling pool, precipitate accumulated on bottom of the secondary settling pool pumped by the pump to the compressor via pipes for separating into filtrate and sludge, flowing the filtrate to the biochemical pool via pipes, and subjecting the filtrate to a biochemical treatment to produce biochemically treated wastewater.

Step 5 of Secondary Catalytic Electrolysis

Flowing biochemically treated wastewater out of upper portion of the secondary settling pool into the secondary nanocatalytic electrolyzer for electrolysis.

In step 5, the operating voltage of the electrolysis may be 2 to 400V, the voltage between the two electrodes may be 2 to 8 V, the current density is 10 to 300 mA/cm$^2$, and wastewater is kept in the secondary nanocatalytic electrolyzer for 1 to 4 min.

Step 6 of Filtration

Flowing wastewater from the secondary nanocatalytic electrolyzer into a fine filter to remove solid impurities.

In step 6, the fine filter can be a sand filter, a multi-media filter or a membrane assembly. The filtered water has chromaticity less than 30, $COD_{Cr}$ less than 150 mg/L, ammonia less than 1 mg/L, SS not detected, and turbidity less than 5.

Step 7 of Membrane Separation

Flowing the filtered water out of the fine filter through the membrane assembly for further filtration for separating into dialysate and concentrate wherein dialysate is reused water, recycled, and concentrate discharge.

In step 7, the membrane assembly is nanometer-filtration or reverse osmosis membrane assembly. Membrane module of the nanometer-filtration membrane assembly is a wound type, etc. Material of the nanometer-filtration membrane assembly is cellulose acetate membrane of organic film or composite nanomembrane. The nanometer-filtration membrane assembly's molecular weight is 200 to 500 MWCO, filtering-in pressure is 6.0 to 45.0 bar, and filtering-out pressure may be 4.5 to 43.5 bar. Membrane module of the reverse osmosis membrane assembly can be a wound type, etc. Material of the reverse osmosis membrane assembly may be cellulose acetate membrane of organic film or composite nanomembrane. The nanometer-filtration membrane assembly's molecular weight is 50 to 500 MWCO, filtering-in pressure is 6.0 to 45.0 bar, and filtering-out pressure may be 4.5 to 43.5 bar. After testing, the filtered water is a colorless liquid, indicators are better than the national standard GB/T 19923-2005 "quality of urban recycled water sourced from industrial water". The main quality indicators are shown in Table 1 of FIG. 2.

The invention is directed to a study about typical dyeing wastewater composition and the nature of typical processing system and a result of the study is to devise a wastewater treatment and purification apparatus and reuse method for recycling.

Advantageous Effects

Comparing with the typical biological flocculation method+biochemical method+membrane separation method (or physico-chemical+biological+membrane separation methods) the invention has the following advantages:

1. Reducing the amount of flocculants by ½ to ⅔ and reducing the consumption per unit of product chemicals and reducing pharmaceutical cost.

2. Reducing sludge discharge by ½ to ⅔, thereby significantly reducing the cost of sludge treatment.

3. After treating, about 65% to 90% of wastewater can be recycled, reducing wastewater discharge, avoiding water pollution to the environment, reducing water resources waste, and having certain economic benefits.

4. Bleaching efficiency is high and chromaticity of discharged concentrated wastewater is small.

5. The total COD effluent decreased by 30% to 40%.

6. Significantly reducing water consumption per unit of product and wastewater discharge, significantly reducing water consumption and wastewater discharge indicators.

7. Strong oxidizing substances produced by the nanocatalytic electrolysis can completely kill microorganisms in wastewater, eliminate microbial contamination of the membrane, reduce membrane cleaning frequency, extend membrane life, represent a significant reduction in energy consumption of membrane assembly operation, and thus greatly reducing operating costs.

Practice has proved that the nanocatalytic electrolysis of the invention has the following effects:

1. Flocculation $OH^-$ produced during electrolysis can be used with several metal ions (e.g., $Fe^{3+}$) to precipitately settle down. These small particles can be precipitated from the coagulant role in promoting aggregation substance suspended in solution deposition. Also during electrolysis, the electric field can quickly destroy water colloidal structure to destabilize flocculation, which greatly reduces the flocculation and limits flocculants dosing, coagulant dosage and flotation.

2. Decolorization

Strong oxidizing radicals produced during electrolysis can quickly degrade the molecular structure of the dye printing, reduce colored material adversely impacted on the quality of the color.

3. Sterilization Effect

Electrolysis generates a lot of strong oxidizing free radicals as well as ecological chlorine, which can quickly kill bacteria and other microorganisms in wastewater and viruses, thereby having a strong sterilization effect.

4. Flotation Effect

The hydrogen generated by the cathode forming a large number of tiny air bubbles, with the gas moving, will bring down a large amount of suspended solids and grease. After flotation, it is possible of achieving the effect of solid-liquid separation, thereby further reducing $COD_{Cr}$, chromaticity and turbidity in the wastewater.

Practice has proved that water electrolysis time is 5 to 15 min preferably. Excessively short time causes insufficient electrolysis, and flocculation and decolorization are poor. Excessively long time, although the effect of flocculation and decolorization is better, but a substantial power is consumed and it is economically undesired.

Practice has proved that regarding the electrolysis time and the concentration of water, the higher the concentration the longer the electrolysis time will be.

Practice has proved that the operating voltage between the electrodes is related to a distance between the electrodes. The smaller the distance the smaller the voltage will be. The voltage between the electrodes is usually 2 to 8 V and the optimum voltage is 3 to 5 V.

Practice has proved that step 2 of the nanocatalytic electrolysis has the following advantages:

1. The required flocculants in step 3 of flocculation, coagulant dosage reduced by 40% to 70% without adding bleaching agent. This not only can significantly reduce chemical consumption, but also can reduce chemical secondary pollution.

2. Reducing discharge of sludge of 40% to 70%.

3. By utilizing a nanocatalytic electrolysis, flocculation, precipitate and flotation, 50% to 75% of the COD in the wastewater can be removed, thereby greatly reducing the load of biochemical treatment.

The above and other objects, features and advantages of the invention will become apparent from the following detailed description taken with the accompanying drawings.

BRIEF DESCRIPTION OF THE DRAWINGS

FIG. 2 is Table 1 showing main quality indicators of reused wastewater according to the invention;

FIG. 3 is Table 2 showing indicators of dyeing wastewater, i.e., combined wastewater according to the invention;

FIG. 4 is Table 3 showing quality indicators of the dialysate, i.e., recycled water according to the invention;

FIG. 5 is Table 4 showing indicators of dyeing wastewater, i.e., combined wastewater according to the invention; and FIG. 6 is Table 5 showing quality indicators of the dialysate, i.e., recycled water according to the invention.

DETAILED DESCRIPTION OF THE INVENTION

Figure 1:
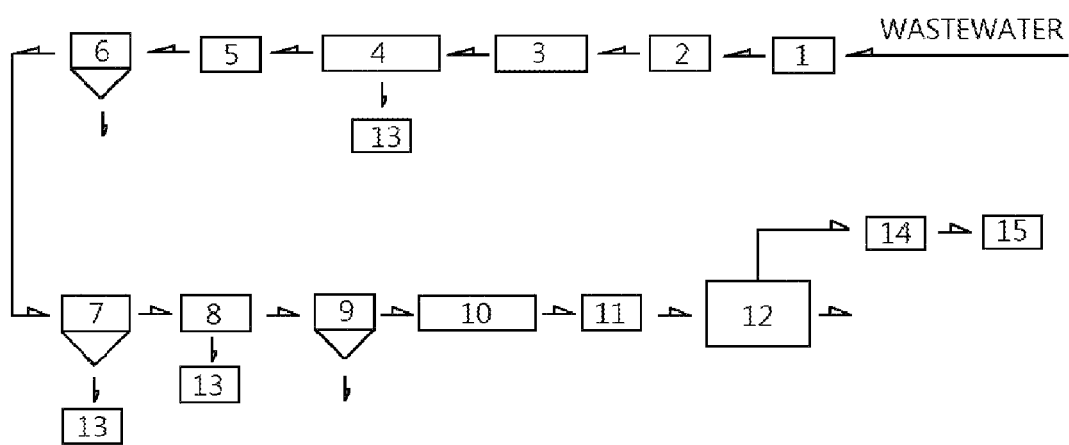
FIG. 1 schematically depicts a printing and dyeing wastewater treatment and reuse apparatus according to the invention.

Referring to FIGS. 1 and 3 to 6, a printing and dyeing wastewater treatment and reuse apparatus in accordance with the invention comprises the following components as discussed in detail below.

A coarse filter 1, a regulation pool 2, a hydraulic sieve 3, a desulfurization pool 4, a nanocatalytic electrolyzer 5, a flocculation pool 6, a settling pool 7, a flotation device 8, a biochemical pool 9, a secondary settling pool 10, a secondary nanocatalytic electrolyzer 11, a fine filter 12, a compressor 13, a nanomembrane assembly 14, and a recycling pool 15 are provided. Inlet of the coarse filter 1 is connected to a combined wastewater source. Outlet of filtered wastewater of the coarse filter 1 is connected to inlet of the regulation pool 2. Inlet of the hydraulic sieve 3 is connected to an outlet of wastewater of the regulation pool 2. Inlet of the desulfurization pool 4 is connected to outlet of the hydraulic sieve 3. Precipitate output of the desulfurization pool 4 is connected to the compressor 13 via a pump and pipes. Inlet of the nanocatalytic electrolyzer 5 is connected to wastewater outlet of the desulfurization pool 4. Outlet of the nanocatalytic electrolyzer 5 is connected to inlet of the flocculation pool 6. Outlet of the flocculation pool 6 is connected to inlet of the settling pool 7. Precipitate outlet of the settling pool 7 is connected to the compressor 13 via a pump and pipes. A wastewater outlet of the settling pool 7 is connected to an inlet of the flotation device 8. An upper impurities outlet of the flotation device 8 is connect to the compressor 13 via a pump and pipes. A lower wastewater outlet of the flotation device 8 is connected to the biochemical pool 9 via a pump. An outlet of the biochemical pool 9 is connected to an inlet of the secondary settling pool 10. An upper wastewater outlet of the secondary settling pool 10 is connected to an inlet of the secondary nanocatalytic electrolyzer 11. A precipitate outlet on a bottom of the secondary settling pool 10 is connected to the compressor 13 via a pump and pipes. A wastewater outlet of the secondary nanocatalytic electrolyzer 11 is connected to an inlet of the fine filter 12. An outlet of the fine filter 12 is connected to an inlet of the membrane assembly 14. A dialysate outlet of the membrane assembly 14 is connected to the recycling pool 15. A condensate outlet of the membrane assembly 14 is connected to an outfall. An outlet of the compressor 13 is connected to a wastewater inlet of the biochemical pool 9 via a pump and pipes. Impurities of the compressor 13 are conveyed to a mud pool via a conveyor.

PREFERRED EMBODIMENTS OF THE INVENTION

Preferred embodiments of the invention based on nanocatalytic technology and membrane electrolysis technology for printing and dyeing wastewater treatment and reuse apparatus and method therefore are detailed below.

Preferred Embodiment 1

Step 1 of Desulfurization

Flowing printing and dyeing wastewater into the coarse filter 1 to remove large particulate solids, next flowing the regulation pool 2 for mixing, and then pumping the wastewater from the regulation pool 2 to the hydraulic sieve 3 to remove fibers and other impurities, and then flowing the filtered wastewater to the desulfurization pool 4. Equivalent concentration of sulfur in wastewater can be determined prior to the desulfurization. Adding a solution of ferrous sulfate with equivalent concentration of 1:1.1 into wastewater for desulfurization and separation into iron sulfide sludge and desulfurized wastewater.

Step 2 of Nanocatalytic Electrolysis

After step 1, pump desulfurized wastewater into the nanocatalytic electrolyzer 5 for electrolysis. The operating voltage of the electrolysis may be 2 to 500V, the voltage between the two electrodes may be 2 to 8 V, electrolytic density is 10 to 300 mA/cm$^2$, the desulfurized wastewater is kept in the nanocatalytic electrolyzer 5 for a time of 5 to 15 min, and electricity consumed for wastewater electrolysis is controlled at 0.8 to 1.2 degree/m$^3$.

Step 3 of Flocculation

After step 2, flowing wastewater which has been processed by the nanocatalytic electrolyzer 5 into the flocculation pool 6, adding prepared flocculants, coagulant agents and flotation agents to the flocculation pool 6 for flocculation reaction, flowing same to the settling pool 7 for precipitate, flowing the precipitate on the bottom of the settling pool 7 to the compressor 13 via pump and pipes for separating into filtrate and sludge, flowing wastewater in the settling pool 7 to the flotation device 8 for separating the impurities from the wastewater, flowing the impurities to a compressor 13 via pump and pipes for separating into filtrate and sludge, flowing the filtrate to the biochemical pool 9, and flowing the wastewater in a lower portion of the flotation device 8 into the biochemical pool 9.

Step 4 of Biochemical Treatment

After step 3, flocculated wastewater in a lower portion of the flotation device 8 flowing into the biochemical pool 9, next subjecting same through aerobic or anaerobic+aerobic or anoxic, and aerobic treatment, and subjecting same in the secondary settling pool 10, flowing the biochemically treated wastewater out of upper portion of the secondary settling pool 10, precipitate accumulated on bottom of the secondary settling pool 10 pumped by the pump to the compressor 13 via pipes for separating into filtrate and sludge, flowing the filtrate to the biochemical pool 9 via pipes, and subjecting the filtrate to a biochemical treatment to produce biochemically treated wastewater which has chromaticity of 1 to 30, $COD_{Cr}$ of 50 to 300 mg/L, and ammonia is of 0 to 5 mg/L.

Step 5 of Secondary Catalytic Electrolysis

Flowing biochemically treated wastewater out of upper portion of the secondary settling pool 10 into the secondary nanocatalytic electrolyzer 11 for electrolysis. The operating voltage of the electrolysis may be 2 to 400V (preferably is 13 to 200V), the voltage between the two electrodes may be 2 to 8 V (preferably is 3 to 5V), the current density is 10 to 300 mA/cm$^2$ (preferably is 100 to 2300 mA/cm$^2$), wastewater is kept in the secondary nanocatalytic electrolyzer for 2 to 3 min (preferably is 3 to 4 min), and electricity consumed for wastewater electrolysis is controlled at 0.9 to 1.2 degree/m$^3$.

Step 6 of Filtration

Flowing wastewater from the secondary nanocatalytic electrolyzer 11 into a fine filter 12 to remove solid impurities. The fine filter 12 can be a sand filter, a multi-media filter or a membrane assembly. The filtered water has SDI of 1 to 5, chromaticity 1 to 30, COD of 50 to 200 mg/L, ammonia of 0 to 5 mg/L, and SS of 0 to 10 mg/L.

Step 7 of Membrane Separation

Flowing the filtered water out of the fine filter 12 through the membrane assembly 14 for further filtration for separating into dialysate and concentrate wherein dialysate is reused water, recycled, and concentrate discharge.

In step 7, the membrane assembly 14 is nanometer-filtration or reverse osmosis membrane assembly. Membrane module of the nanometer-filtration membrane assembly is a wound type, etc. Material of the nanometer-filtration membrane assembly is cellulose acetate membrane of organic film or composite nanomembrane. The nanometer-filtration membrane assembly's molecular weight is 200 to 500 MWCO, filtering-in pressure is 6.0 to 45.0 bar, and filtering-out pressure may be 4.5 to 43.5 bar. 75% to 85% of dialysate (i.e., recycled water) can be produced after flowing the filtered water of the fine filter 12 through the membrane assembly 14. The recycled water is a colorless liquid, COD is less than 30 mg/L, ammonia is less than 5 mg/L, SS not detected, and removal rate of divalent ion is greater than 95%.

The reverse osmosis membrane assembly is a wound type. The membrane material may be an organic film cellulose acetate film or composite film. Its molecular weight cutoff is 50 to 200 MWCO, filtering-in pressure is 6.0 to 45.0 bar, and filtering-out pressure may be 4.5 to 43.5 bar. 60% to 75% of dialysate (i.e., recycled water) can be produced after flowing the dialysate through the reverse osmosis membrane assembly. The recycled water is a colorless liquid, COD is less than 10 mg/L, ammonia is less than 0.1 mg/L, SS not detected, and desalination rate of divalent ion is greater than 95%.

Preferred Embodiment 2

As shown in FIG. 1, it is a preferred embodiment of the invention based on nanocatalytic technology and membrane electrolysis technology for printing and dyeing wastewater treatment and reuse apparatus and method therefore. For example, it is a 300 tons/day dyeing wastewater treatment, purification, and reuse project. The dyeing wastewater (combined wastewater) having indicators is shown in Table 2 of FIG. 3.

Wastewater flows at a flow rate of 15 $m^3$/hour into the coarse filter 1 to remove large particulate solids. Next, flows to the regulation pool 2 for mixing. Next, flows wastewater out of the regulation pool 2 at a flow rate of 15 $m^3$/hour to the hydraulic sieve 3 to filter out fibers and other impurities. Next, flows into the desulfurization pool 4. The desulfurized wastewater flows into the nanocatalytic electrolyzer 5 for electrolysis. The operating voltage of the nanocatalytic electrolyzer 5 is 48V, current intensity is 375 A, and the voltage between the electrodes is 4.2 V. Nascent chlorine [Cl] generated by nanocatalytic electrolysis may kill microorganisms in wastewater, oxidize and decompose organic matters in wastewater, and cause suspended solids, colloids, charged particles in the wastewater to form larger particles in the field of electricity. Thereafter, electrolyzed wastewater flows into the flocculation pool 6. Next, adding iron and polyacrylamide polymer in the flocculation pool 6 for coagulation reaction. Next, the flocculated wastewater flows into the settling pool 7. Impurities at bottom of the settling pool 7 are pumped through a compressor 13 to separate into filtrate and sludge. Sludge in upper portion of the settling pool 7 flows into the flotation device 8 via a pump and pipes for separation into filtrate and sludge. The filtrate flows through the biochemical pool 9. Wastewater in a lower portion of the flotation device 8 is pumped into the biochemical pool 9. An aerobic treatment is done on wastewater in the biochemical pool 9. Next, the wastewater re-enters the secondary settling pool 10 for precipitation and separation. After biochemical treatment, wastewater in the upper portion of the secondary settling pool 10 flows out. Precipitate on bottom of the secondary settling pool 10 is pumped into the compressor 13 via a pump and pipes to be filtered and separated into filtrate and sludge. The filtrate flows into the biochemical pool 9 via pipes for biological treatment. The wastewater treated by the secondary settling pool 10 has chromaticity of 65, COD of 265 mg/L, and ammonia of 3.7 mg/L. Biochemically treated wastewater flows out of the secondary settling pool 10 into the secondary nanocatalytic electrolyzer 11 for electrolysis. Regarding the electrolysis, operating voltage is 40V, current is 375 A, wastewater is kept in the secondary nanocatalytic electrolyzer 11 for 3 min. Membrane material of the nanomembrane assembly 14 is cellulose acetate film having a molecular weight is 200 MWCO, filtering-in pressure is 6.5.bar, and filtering-out pressure is 4 bar. 85% of dialysate (i.e., recycled water) can be produced after flowing the filtered water of the fine filter 12 through the nanomembrane assembly 14. Quality indicators of the dialysate (recycled water) are shown in Table 3 of FIG. 4.

Preferred Embodiment 3

3,000 tons/day dyeing wastewater treatment, purification, and reuse project

The dyeing wastewater (combined wastewater) has indicators as shown in Table 4 of FIG. 5.

Wastewater flows at a flow rate of 15 $m^3$/hour into the coarse filter 1 to remove large particulate solids. Next, flows to the regulation pool 2 for mixing. Next, flows wastewater out of the regulation pool 2 at a flow rate of 15 $m^3$/hour to the hydraulic sieve 3 to filter out fibers and other impurities. Next, flows into the desulfurization pool 4. The desulfurized wastewater flows into the nanocatalytic electrolyzer 5 for electrolysis. The operating voltage of the nanocatalytic electrolyzer 5 is 380V, current intensity is 3475 A, and the voltage between the electrodes is 4.2 V, and current density is 230 mA/$cm^2$. Nascent chlorine [Cl] generated by nanocatalytic electrolysis may kill microorganisms in wastewater, oxidize and decompose organic matters in wastewater, and cause suspended solids, colloids, charged particles in the wastewater to form larger particles in the field of electricity. Thereafter, electrolyzed wastewater flows into the flocculation pool 6. Next, adding iron and polyacrylamide polymer in the flocculation pool 6 for coagulation reaction. Next, the flocculated wastewater flows into the settling pool 7. Impurities at bottom of the settling pool 7 are pumped through a compressor 13 to separate into filtrate and sludge. Sludge in upper portion of the settling pool 7 flows into the flotation device 8 via a pump and pipes for separation into filtrate and sludge. The filtrate flows through the biochemical pool 9. Wastewater in a lower portion of the flotation device 8 is pumped into the biochemical pool 9. An aerobic treatment is done on wastewater in the biochemical pool 9. Next, the wastewater re-enters the secondary settling pool 10 for precipitation and separation. After biochemical treatment, wastewater in the upper portion of the secondary settling pool 10 flows out. Precipitate on bottom of the secondary settling pool 10 is pumped into the compressor 13 via a pump and pipes to be filtered and separated into filtrate and sludge. The filtrate flows into the biochemical pool 9 via pipes for biological treatment. The wastewater treated by the secondary settling pool 10 has chromaticity of 185, $COD_{Cr}$ of 175 mg/L, and ammonia of 1.5 mg/L. Biochemically treated wastewater flows out of the secondary settling pool 10 into the secondary nanocatalytic electrolyzer 11 for electrolysis. Regarding the electrolysis, operating voltage is 380V, current is 3670 A, wastewater is kept in the secondary nanocatalytic electrolyzer 11 for 3 min. The wastewater electrolyzed by the secondary nanocatalytic electrolyzer 11 is in turn filtered by the fine filter 12. The electrolyzed wastewater has a chromaticity of 30, $COD_{Cr}$ of 142 mg/L, ammonia of 0 mg/L, SS of 1 mg/L, and SDI of 2. The fine filter 12 filters the electrolyzed wastewater prior to flowing it into the nanomembrane assembly 14. The nanomembrane assembly 14 is a reverse osmosis membrane assembly. Membrane module of the nanomembrane assembly 14 is a wound type and its material is a composite nanomembrane. Membrane material of the nanomembrane assembly 14 has a molecular weight of 50 MWCO, filtering-in pressure of 15.0 bar, and filtering-out pressure of 2.5 bar. 75% of dialysate (i.e., recycled water) can be produced after flowing the filtered water of the fine filter 12 through the nanomembrane assembly 14. Quality indicators of the dialysate (recycled water) are shown in Table 5 of FIG. 6.

INDUSTRIAL APPLICABILITY

Comparing with the typical biological flocculation method+biochemical method+membrane separation method (or physico-chemical+biological+membrane separation methods) the invention has the following advantages: Reducing the amount of flocculants by ½ to ⅔. Reducing the consumption per unit of product chemicals and reducing pharmaceutical cost. Reducing sludge discharge by ½ to ⅔, thereby significantly reducing the cost of sludge treatment. After treatment, about 65% to 90% of wastewater can be recycled, reducing wastewater discharge, avoiding water pollution to the environment, reducing water resources waste, and having certain economic benefits. Bleaching efficiency is high and chromaticity of discharged concentrated wastewater is small. The total COD effluent decreased by 30% to 40%. Significantly reducing water consumption per unit of product and wastewater discharge, significantly reducing water consumption and wastewater discharge indicators. Strong oxidizing substances produced by the nanocatalytic electrolysis can completely kill microorganisms in wastewater, eliminate microbial contamination of the membrane, reduce membrane cleaning frequency, extend membrane life, represent a significant reduction in energy consumption of nanomembrane assembly operation, and thus greatly reducing operating costs. Therefore, the invention has good industrial applicability.

While the invention has been described in terms of preferred embodiments, those skilled in the art will recognize that the invention can be practiced with modifications within the spirit and scope of the appended claims.

What is claimed is:

1. A printing and dyeing wastewater treatment and reuse apparatus comprising:
    a coarse filter;
    a regulation pool;
    a hydraulic sieve;
    a desulfurization pool;
    a nanocatalytic electrolyzer;
    a flocculation pool;
    a flocculation tank;
    a settling pool;
    a flotation device;
    a biochemical pool;
    a secondary settling pool;
    a secondary nanocatalytic electrolyzer;
    a fine filter;
    a compressor;
    a nanomembrane assembly; and
    a recycling pool;
    wherein the coarse filter has an inlet and an outlet connected to an inlet of the regulation pool, an inlet of the desulfurization pool is connected to an outlet of the hydraulic sieve, a precipitate outlet of the desulfurization pool is connected to the compressor, an inlet of the nanocatalytic electrolyzer is connected to a wastewater outlet of the desulfurization pool, an outlet of the nanocatalytic electrolyzer is connected to an inlet of the flocculation pool, an outlet of the flocculation pool is connected to an inlet of the settling pool, a wastewater outlet of the settling pool is connected to an inlet of the flotation device, a precipitate outlet of the settling pool is connected to the compressor, a precipitate outlet of the flotation device is connected to the compressor, a wastewater outlet of the flotation device is connected to an inlet of the biochemical pool, an outlet of the biochemical pool is connected to an inlet of the secondary settling pool, a wastewater outlet of the secondary settling pool is connected to an inlet of the secondary nanocatalytic electrolyzer, a wastewater outlet of the secondary nanocatalytic electrolyzer is connected to an inlet of the fine filter, an outlet of the fine filter is connected to an inlet of the nanomembrane assembly, an outlet of the nanomembrane assembly is connected to the recycling pool for producing water for reuse, a condensate outlet of the nanomembrane assembly is for discharge, and impurities in the compressor are for discharge.

2. The printing and dyeing wastewater treatment and reuse apparatus of claim 1, wherein an impurities outlet of the flotation device is disposed on an upper portion thereof, the wastewater outlet of the flotation device is located on a lower portion thereof, the wastewater outlet of the secondary settling pool is located on an upper portion thereof, and a precipitate outlet of the secondary settling pool is located on a bottom thereof.

3. The printing and dyeing wastewater treatment and reuse apparatus of claim 1, wherein an anode of the nanocatalytic electrolyzer is a titanium substrate having a surface covered with crystal grains of 18 to 22 nm nanocatalytic coating and served as an inert electrode, and a cathode of the nanocatalytic electrolyzer is a cathode made of iron, aluminum, stainless steel, zinc, copper or graphite.

4. A printing and dyeing wastewater treatment and reuse method, comprising the steps of:
    (1) desulfurization by flowing combined printing and dyeing wastewater into a coarse filter to remove large particles of solids prior to flowing into a regulation pool, pumping the combined printing and dyeing wastewater out of the regulation pool to pass through a hydraulic sieve to remove fibers and impurities prior to flowing into a desulfurization pool, adding ferrous sulfate solution to the combined printing and dyeing wastewater, performing desulfurization, and separating the combined printing and dyeing wastewater into iron sulfide sludge and desulfurized wastewater;
    (2) nanocatalytic electrolysis by pumping the desulfurized wastewater into a nanocatalytic electrolyzer for electrolysis;

(3) flocculation by flowing the electrolyzed wastewater into a flocculation pool, adding a flocculant, a coagulant agent, and a flotation agent to the flocculation pool for flocculation, flowing the flocculated wastewater to a settling pool for forming precipitate, flowing the precipitate on a bottom of the settling pool to a compressor for separating into filtrate and sludge, flowing the wastewater in the settling pool to a flotation device for separating impurities from the wastewater, and flowing the impurities from the flotation device to the compressor for separating into filtrate and sludge;

(4) biochemical treatment by flowing the wastewater in the lower portion of the flotation device into a biochemical pool, subjecting the wastewater to an aerobic treatment, an anaerobic and aerobic treatment, or an anoxic and aerobic treatment, and subjecting the wastewater to a biochemical treatment in a secondary settling pool for forming precipitate;

(5) secondary catalytic electrolysis by flowing the biochemically treated wastewater out of an upper portion of the secondary settling pool into a secondary nanocatalytic electrolyzer for electrolysis;

(6) filtration by flowing the electrolyzed wastewater from the secondary nanocatalytic electrolyzer into a fine filter to remove solid impurities; and (7) membrane separation by flowing a filtrate out of the fine filter through a nanomembrane assembly for separating into dialysate and concentrate wherein the dialysate is water for reuse and the concentrate is for discharge.

5. The printing and dyeing wastewater treatment and reuse method of claim 4, wherein in step (1) equivalent concentration of sulfur in the wastewater is determined prior to the desulfurization, and subsequently adding a solution of ferrous sulfate with equivalent concentration of 1:1.1 to the wastewater for desulfurization and separation into iron sulfide sludge and desulfurized wastewater.

6. The printing and dyeing wastewater treatment and reuse method of claim 4, wherein in step (2) an operating voltage of the electrolysis is 2 to 500 V, a voltage between two electrodes is 2 to 8 V, an electrolytic density is 10 to 300 mA/cm$^2$, and the desulfurized wastewater is kept in the nanocatalytic electrolyzer for a time of 5 to 15 minutes.

7. The printing and dyeing wastewater treatment and reuse method of claim 4, wherein in step (3) the flocculant is ferrous sulfate, ferric sulfate, poly iron, aluminum sulfate, aluminum chloride, or poly aluminum, the coagulant agent is lime or polyacrylamide (PAM), and the flotation agent is PAM.

8. The printing and dyeing wastewater treatment and reuse method of claim 4, wherein in step (5) an operating voltage of the electrolysis is 2 to 400 V, a voltage between two electrodes may is 2 to 8 V, a current density is 10 to 300 mA/cm$^2$, and the wastewater is kept in the secondary nanocatalytic electrolyzer for 1 to 4 minutes.

9. The printing and dyeing wastewater treatment and reuse method of claim 4, wherein in step (6) the fine filter is a sand filter, a multi-media filter or a membrane assembly.

10. The printing and dyeing wastewater treatment and reuse method of claim 4, wherein in step (7) the nanomembrane assembly is a nanometer-filtration membrane assembly or a reverse osmosis membrane assembly; a membrane module of the nanometer-filtration membrane assembly is a wound type, material of the nanometer-filtration membrane assembly is cellulose acetate membrane of organic film or composite nanomembrane, the nanometer-filtration membrane assembly's molecular weight is 200 to 500 MWCO, a filtering-in pressure is 6.0 to 45.0 bar, and a filtering-out pressure is 4.5 to 43.5 bar; and a membrane module of the reverse osmosis membrane assembly is a wound type, material of the reverse osmosis membrane assembly is cellulose acetate membrane of organic film or composite nanomembrane, the reverse osmosis membrane assembly's molecular weight is 50 to 200 MWCO, a filtering-in pressure is 6.0 to 45.0 bar, and a filtering-out pressure is 4.5 to 43.5 bar.

* * * * *